United States Patent [19]

Belanger

[11] Patent Number: 4,736,769

[45] Date of Patent: Apr. 12, 1988

[54] DEVICE FOR INTRODUCING AN ADDITIVE LIQUID INTO A CARRIER LIQUID FLOWING IN A PIPE

[76] Inventor: Louis Belanger, 191, Rang Gravel, Ste-Beatrix, (Quebec), Canada, J0K 1Y0

[21] Appl. No.: 78,806

[22] Filed: Jul. 28, 1987

[51] Int. Cl.$^4$ .......................... E03B 7/07; F16L 39/00
[52] U.S. Cl. .................... 137/564.5; 285/45; 285/137.1; 285/921
[58] Field of Search .......................... 137/564.5, 205.5; 285/45, 137.1, 921

[56] References Cited

U.S. PATENT DOCUMENTS

| | | | |
|---|---|---|---|
| 445,909 | 2/1891 | Shontz | 137/205.5 |
| 2,323,618 | 7/1943 | Ottoson | 137/564.5 |
| 2,865,388 | 12/1958 | Sternbergh | 137/101.17 |
| 2,932,317 | 4/1960 | Klosse | 137/564.5 |
| 3,135,279 | 6/1964 | Dunklee, Jr. | 137/99 |
| 3,166,096 | 1/1965 | Lang | 137/564.5 |
| 3,187,769 | 6/1965 | McDowell et al. | 137/564.5 |
| 3,192,950 | 7/1965 | Weese et al. | 137/564.5 |
| 3,220,435 | 11/1965 | Ellingson | 137/564.5 |
| 3,345,086 | 10/1967 | Wallace | 285/137.1 X |
| 3,392,753 | 7/1968 | Kleinmann | 137/564.5 |
| 3,521,671 | 7/1970 | Handeland | 137/564.5 |
| 3,720,230 | 3/1973 | Stockstill | 137/564.5 |
| 3,740,801 | 6/1973 | Sears, Jr. et al. | 285/137.1 X |
| 3,783,866 | 1/1974 | Tirkkonen | 128/213 |
| 3,784,235 | 1/1974 | Kessler et al. | 285/921 X |
| 3,809,412 | 5/1974 | Glover | 285/921 X |
| 3,885,820 | 5/1975 | Trumbull et al. | 285/137.1 |
| 3,937,241 | 2/1976 | Cloup | 137/99 |
| 4,047,541 | 9/1977 | Mercier et al. | 137/564.5 |
| 4,060,351 | 11/1977 | Cloup | 417/520 |
| 4,210,175 | 7/1980 | Daniels et al. | 137/564.5 |
| 4,226,445 | 10/1980 | Kramer | 285/45 X |
| 4,545,535 | 10/1985 | Knapp | 137/564.5 X |

OTHER PUBLICATIONS

Chemilizer Products Inc. "How Safe is the Water You Drink", Disinfect Contaminated Water Easily Effectively Inexpensively, no date.
Festo-Accessoires "Bloc d'Accouplement Multiple Type KM-8-PK-4", page catalogue 3.330, no date.
Medicator Control Center, "Consistency of Medication Delivery"; no date.
Duramedic, "Proprotionneur de Liquids par Durvet"; no date.
Festo-Accessoires, "Connecteur Multiple Pour Tuyau", page catalogue 3.335; Sep., 1978.
Agri-Pro Enterprises, Profel, Liquid Dispenser. "Now You Can Accurately Meter One Ounce Per Gallon of . . . "; no date.
JF Equipment Co. Dosmatic Liquid Dispenser, "Installation and Maintenance Instructions"; no date.

Primary Examiner—Alan Cohan
Assistant Examiner—John Rivell
Attorney, Agent, or Firm—Robic, Robic & Associates

[57] ABSTRACT

A device for introducing an additive liquid into a carrier liquid, which comprises a pipe section with a venturi in which the carrier liquid is caused to flow. A first tube has an end connected to the pipe section upstream of the venturi, while a second tube of small diameter is formed in the walls of the first tube and pipe section. The second tube has a two-branched end defining a first orifice in the pipe section downstream of the venturi and a second orifice inside the venturi. The first and second tubes comprises adjacent free ends. A third tube has an end communicating with a first compartment of a plastic bag, while a small diameter fourth tube formed within the wall of the third tube has an end communicating with a second compartment of the bag containing the additive liquid. The third and fourth tubes comprise adjacent free ends. A quick-fit connector removably and simultaneously connects together the free ends of the first and third tubes, and the free ends of the second and fourth tubes. In operation, the carrier liquid is transmitted in the bag first compartment through a pressure limiting valve mounted in the first tube. When the valve is open or closed, additive liquid is introduced in the carrier liquid through the first or second orifice, respectively.

23 Claims, 3 Drawing Sheets

DEVICE FOR INTRODUCING AN ADDITIVE LIQUID INTO A CARRIER LIQUID FLOWING IN A PIPE

BACKGROUND OF THE INVENTION

1. Field of the invention:

The present invention relates to an improved device for introducing an additive liquid into a carrier liquid which is caused to flow in a main pipe.

2. Brief description of the prior art:

Prior art additive liquid introducing devices of the above type are known which use a difference in pressure produced by a constriction formed in a main pipe through which the carrier liquid is caused to flow. A container is divided in two compartments by a flexible, impermeable. membrane, and has its first compartment connected through a first conduit with the main pipe upstream of the constriction and its second compartment, containing the additive liquid, connected through a second conduit with the main pipe at the constriction or downstream thereof. The container is usually connected to the main pipe through two separate connections, while the second compartment can often be refilled with additive liquid.

In operation, the carrier liquid from the main pipe is transmitted in the first compartment through the first conduit. As the pressure of the carrier liquid upstream of the constriction is higher than that in the constriction or downstream thereof, the carrier liquid in the first compartment applies a pressure on the additive liquid through the flexible membrane. The additive liquid is then introduced in the carrier liquid in the constriction or downstream thereof through the second conduit.

Such prior art additive liquid introducing devices are described, for example, in U.S. Pat. Nos.

| 2.865.388 | (STERNBERGH) | December 23, 1958 |
| 2.932.317 | (KLOSSE) | April 12, 1960 |
| 3.166.096 | (LANG) | January 19, 1965 |
| 3.220.435 | (ELLINGSON) | November 30, 1965 |
| 3.720.230 | (STOCKSTILL) | March 13, 1973 |
| 4.210.175 | (DANIELS et AL) | July 1st, 1980 |

As the above listed United States Patents describe two separate connections, often permanent, of the first and second compartments of the container with the main pipe, the use of disposable containers having their second compartment already filled with additive liquid upon purchase would necessitate two time consuming and tedious disconnection-connection operations each time the container is changed. It is the reason why, in the prior art additive liquid introducing devices, the container is often permanent, and is designed for refilling of its second compartment with additive liquid.

An important drawback of the above described prior art additive liquid introducing devices is that they are bulky and relatively expensive. It is therefore expensive to mount some of them, as an example, on different water pipes for introducing different liquid medicaments in these different pipes separately supplying with water different animals in order to achieve different medications on these different animals. Also it is known to mount a prior art introducing device on a pipe supplying with water a plurality of animals; the drawback is that the introduction of a liquid medicament in the water causes supply of the same to all the animals even if only one needs it. As the prior art additive liquid introducing devices are bulky, a plurality of such introducing devices cannot be mounted on a same pipe for simultaneously introducing different additive liquids in the carrier liquid. Moreover, since the prior art devices are often permanently installed, they cannot be easily displaced from one pipe to the other.

Appropriate cares must also be taken when refilling with additive liquid the second compartment of the permanent container. First of all, when different additive liquids have to be successively introduced in the carrier liquid, the second compartment must, in most of the cases, be carefully washed in order to prevent mixing of incompatible additive liquids. When the additive liquids are medicaments, such mixing can produce toxic substances or a medicament with a reduced efficiency.

In the case of a medicament, water or another medicament must often be mixed thereto prior to refilling the second compartment. If such mixing is carried out without precautions by an unskilled person, for example in a non-sterile vessel, the medicament is contaminated.

U.S. Pat. No. 3.392.753 (KLEINMANN) issued on July 16, 1968, discloses an additive liquid introducing device of the above type using a disposable container. Again, the first and second compartments are connected with the main pipe through two different conduits. Replacement of the container therefore requires two different disconnection-connection operations. The container is formed by plastic bottles or jugs having an inner, flexible membrane. These bottles or jugs can be purchased with their second compartment filled with the additive liquid, and are disposed of after use. Such plastic bottles or jugs constitute relatively expensive disposable units.

A further drawback of the prior art additive liquid introducing devices is that each device can introduce in the carrier liquid only one additive liquid at the same time. Consequently, the user is prevented from simultaneously introducing in the carrier liquid different additive liquids which cannot be mixed beforehand, for example medicaments, possibly with different concentrations.

OBJECTS OF THE INVENTION

A first object of the present invention is therefore to provide an additive liquid introducing device with a disposable container which can be easily replaced in a single disconnection-connection operation, by means of a quick-fit connector.

A second object of the present invention is to provide an additive liquid introducing device of low cost and of small dimensions, whereby a plurality of such small-dimension introducing devices can be mounted at reasonable cost on different pipes to introduce different additive liquids in the carrier liquid flowing in these different pipes, or a plurality of such small-dimension introducing devices can be mounted also at reasonable cost on a same pipe to simultaneously introduce in the carrier liquid flowing in this pipe a plurality of different additive liquids. As an example, when different introducing devices are mounted on different pipes separately supplying with water different animals, only the necessary medicament can be introduced in the water supplied to each animal and that in the required quantity. An economy of medicament therefore results.

A third object of the present invention is to provide an additive liquid introducing device of low cost and small dimensions which can be easily transferred from one pipe to the other.

A fourth object of the present invention is an additive liquid introducing device using as container a disposable low-cost unit including a two-compartment bag made of thin, flexible and impermeable material, such as transparent plastic. The disposable unit is purchased with the second compartment of the bag sealed and filled with additive liquid. As the second compartment of the bag is sealed no contamination of the additive liquid is possible. Moreover, both mixing of the additive liquid which can cause contamination of the latter, and refilling with additive liquid of the second compartment, including the accompanying inconveniences, are eliminated.

Another object of the present invention is an additive liquid introducing device using a disposable container with a plastic bag defining the first compartment receiving the carrier liquid, and a plurality of second compartments. Such a container is purchased with its second compartments filled with respective additive liquids to be simultaneously introduced in the carrier liquid, which additive liquids cannot be mixed beforehand.

A further object of the invention is an additive liquid introducing device having means for easily and precisely adjust the quantity of additive liquid introduced by volume unit of carrier liquid.

A seventh object of the present invention is an additive liquid introducing device which requires no maintenance.

Another further object of the invention is to provide an additive liquid introducing device which is usable for an emulsion or suspension.

SUMMARY OF THE INVENTION

Accordingly, the present invention relates to a device for introducing an additive liquid into a carrier liquid which is caused to flow in a main pipe, comprising a pipe section so connected with the main pipe that the carrier liquid flows in this pipe section, and a constriction formed in the pipe section and traversed by the carrier liquid. The carrier liquid is therefore under a first pressure upstream of the constrictions and under a second pressure lower than the first pressure downstream of the constriction. The additive liquid introducing device according to the invention further includes first tube means, a bag made of thin, flexible impermeable material, second tube means, and a quick-fit connector. The first tube means comprises (a) a first tube having a first end connected to the pipe section upstream of the constriction, and a second free end, and (b) a second tube having a first end defining a first orifice communicating with the inside of the pipe section downstream of the constriction, and a second, free end adjacent to the second end of the first tube. The bag defines an inner membrane which divides it into first and second compartments, the latter containing the additive liquid. The second tube means comprises (a) a third tube having a first end attached to the bag and communicating with the first compartment, and a second, free end, and (b) a fourth tube having a first end also attached to the bag and communicating with the second compartment, and a second, free end adjacent to the second end of the third tube. The quick-fit connector is provided with first connecting means mounted on the second ends of the first and second tubes, and second connecting means mounted on the second ends of the third and fourth tubes, which first and second connecting means being designed for simultaneous connection of the second end of the third tube with the second end of the first tube, and of the second end of the fourth tube with the second end of the second tube, as well as for simultaneous disconnection of the second end of the third tube from the second end of the first tube, and of the second end of the fourth tube from the second end of the second tube.

In operation, the carrier liquid under the first pressure upstream of the constriction is transmitted in the first compartment through the interconnected first and third tubes to apply pressure on the additive liquid in the second compartment through the inner membrane, to thereby cause flowing of additive liquid from the second compartment through the interconnected second and fourth tubes and introduction thereof in the carrier liquid under the second pressure downstream of the constriction through the first orifice.

In accordance with a preferred embodiment of the present invention, the bag is made of thin, flexible plastic and transparent material and the constriction is formed by a venturi positioned in the pipe section. In such a preferred embodiment, pressure limiting means are disposed in the first tube for limiting to a predetermined value the pressure of the carrier liquid in the first compartment by closing the first tube when the pressure of the carrier liquid in the first compartment reaches the predetermined value in order to prevent breaking of the bag, the first end of the second tube defines a second orifice communicating with the inside of the venturi so that, when the pressure limiting means closes the first tube, the increase in speed of the carrier liquid within the venturi produces in the constriction a depression which causes by aspiration flowing of additive liquid from the second compartment through the second and fourth tubes and introduction thereof in the carrier liquid through the second orifice.

The bag, the second tube means and the second connecting means advantageously constitute a unit made of plastic material and disposed of after use. By means of the quick-fit connector, such a disposable unit can be easily replaced by a new one through a single disconnection-connection operation.

The bag of the additive liquid introducing device according to the invention may be provided with a plurality of second compartments, containing different additive liquids, possibly of different concentrations. As all these second compartments communicate with the first end of the fourth tube, additive liquids from the second compartments can be simultaneously introduced in the carrier liquid. This is particularly useful when different medicaments which cannot be mixed beforehand must be introduced in the carrier liquid in different concentrations.

In accordance with another preferred embodiment of the additive liquid introducing device according to the invention, the pipe section comprises two ends provided with means for removably connecting this pipe section with said main pipe. Easy transfer of the pipe section from one pipe to the other is thereby enabled.

The objects, advantages and other features of the present invention will become more apparent upon reading of the following non restrictive description of a preferred embodiment thereof, given for the purpose of exemplification only with reference to the accompanying drawings in which:

DETAILED DESCRIPTION OF THE PREFERRED EMBODIMENT

Figure 1:
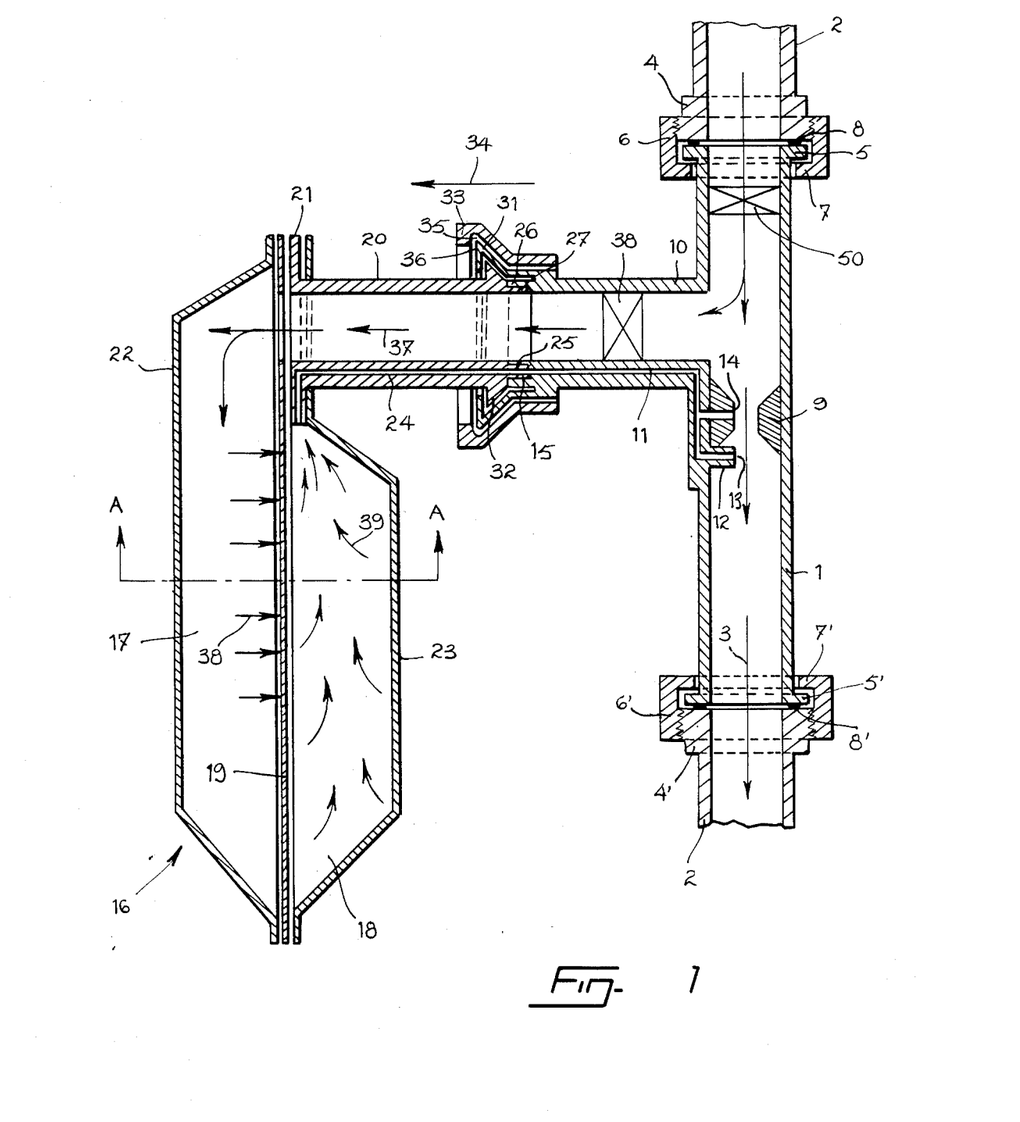
FIG. 1 is a longitudinal, cross sectional view of an embodiment of the additive liquid introducing device in accordance with the present invention.

As shown in FIG. 1 of the attached drawings, the additive liquid introducing device according to the invention comprises a pipe section 1 connected in series with a main pipe 2 in which the carrier liquid is caused to flow in the direction shown by the arrows such as 3.

The confronting ends of the main pipe 2 are each provided with a threaded collar 4, 4', while the ends of the pipe section 1 are each provided with an outer flange 5, 5'. Two nuts 6, 6' are threaded on the inside and each provided with an inner flange slidably mounted around the pipe section 1. In order to mount the pipe section 1 on the main pipe 2, the user positions the pipe section 1 between the collars 4, 4' as shown in FIG. 1, with the nuts 6, 6' slid towards the center of the pipe section 1 and with two annular gaskets 8, 8' respectively positioned between the corresponding pairs of collar 4-flange 5 and collar 4'-flange 5'. The nuts 6, 6' are then screwed on the threaded collars 4, 4', respectively. During screwing, the inner flanges of the nuts 6, 6' abut on the flanges 5, 5' so as to crush the gaskets 8, 8', respectively, thereby forming liquidtight joints between the collar 4 and the flange 5, and between the collar 4' and the flange 5'. The gaskets 8, 8' can be for example made of rubber.

In order to remove the pipe section 1 from the main pipe 2, the user has only to unscrew the nuts 6, 6' and to slide them towards the center of the pipe section 1. The pipe section 1 is then moved laterally with respect to the main pipe 2.

It can therefore be easily appreciated that, when flowing of water through the pipe 2 is interrupted by means for example of a valve, the additive liquid introducing device according to the invention can be easily mounted on and removed from the main pipe 2 through connection and disconnection of the pipe section 1 to and from the main pipe 2. Easy transfer of the additive liquid introducing device from one liquid pipe to the other is thereby enabled. The small dimensions of the additive liquid introducing device facilitate such transfer. After the pipe section 1 has been removed, flowing of water through the main pipe 2 can be enabled by mounting between the ends of the pipe 2 an ordinary pipe section provided with nuts such as 6 and 6', or by any other means.

In some cases, it can be suitable to permanently connect the pipe section 1 in series with the main pipe 2. In this case, the nuts 6, 6', the flanges 5, 5', and the collars 4, 4' can be replaced by permanent connectors.

The pipe section 1 is preferably made of substantially rigid plastic material and includes a venturi 9 disposed therein. The venturi 9 can be made integral with the pipe section 1 or formed by a separate piece of plastic material glued on the inner surface of the pipe section 1.

As the carrier liquid flows in the pipe section 1, a difference in pressure is produced by the venturi. Indeed, the pressure of the carrier liquid upstream of the venturi 9 is somewhat higher than that downstream of this venturi.

A tube 10 is connected perpendicular with the pipe section 1 upstream of the venturi 9. The tube 10, preferably made of substantially rigid plastic material, comprises an internal longitudinal protuberance, while the pipe section 1 is provided with an external longitudinal protuberance. In these two longitudinal protuberances is formed a small diameter tube 11. The tube 11 comprises a two-branched end which defines, by means of a tubular extension 12, a first orifice 13 communicating with the inside of the pipe section 1 downstream of the venturi 9. The tubular extension 12 may be integral with the pipe section 1 or glued on the inner surface thereof. The two-branched end of the tube 11 also defines a second orifice 14 communicating with the inside of the constriction formed by the venturi 9. As illustrated in FIG. 1, the free ends 26 and 15 of the tubes 10 and 11, respectively, have increased internal diameters.

The additive liquid introducing device further comprises a bag generally identified by the reference 16 which defines a first compartment 17 and a second compartment 18 separated from each other by a flexible, impermeable membrane 19.

A tube 20 has a first end which communicates with the first compartment 17 of the bag 16 and a second, free end 27 with a reduced external diameter which can be inserted in the end 26 with increased internal diameter of the tube 10. The reduced external diameter of the end 27 is therefore substantially identical to the increased internal diameter of the end 26. The tube 20 is also provided at its first end with an annular, flat flange 21 perpendicular to the longitudinal axis of the tube 20. Again, the tube 20 is advantageously made of substantially rigid plastic material.

The bag 16 is made of thin, transparent flexible plastic material. A first layer of transparent plastic material, which constitutes the flexible impermeable membrane 19, is provided with a hole having a diameter corresponding to the inner diameter of the tube 20. The layer 19 is attached in the periphery of its hole on the flange 21 through a heating process. A second layer 22 of transparent plastic material has its periphery attached to the periphery of the layer 19 through the same heating process so as to form the first compartment 17 communicating with the first end of the tube 20. The bag 16 comprises a third layer 23 of transparent plastic material which includes a hole of diameter corresponding to the outer diameter of the tube 20 and has the periphery of its hole attached through the heating process to the flange 21 on the side opposite to the layers 19 and 22. The layer 23 has also its periphery attached to the periphery of the layer 19 by means of the heating process, so as to form the second compartment 18 of the bag 16 containing the additive liquid.

The tube 20 is provided with an inner longitudinal protuberance in which a small diameter tube 24 is formed. The tube 24 extends through the flange 21 to communicate with the second compartment 18 of the bag 16. The other, free end of the tube 24 comprises a tubular extension 25 dimensioned for insertion in the end 15 with increased internal diameter of the tube 11. The outer diameter of the extension 25 and the increased diameter of the end 15 of the tube 11 are therefore substantially the same.

When the end 27 with reduced external diameter of the tube 20 is inserted in the end 26 with increased internal diameter of the tube 10, with the tubular extension 25 also inserted in the end 15 with increased internal diameter of the tube 11, a first 0-ring 28 (FIG. 2) preferably made of rubber material and inserted in an annular groove 29 formed on the external surface of the free end 27 of the the tube 20, as well as a second 0-ring 30 (FIG. 2) also made of rubber and inserted in an annular groove formed on the external surface of the tubular extension 25 ensure imperviousness of the joints between the ends 26 and 27 of the tubes 10 and 20, and between the tubular extension 25 and the end 15 of the tube 11.

Figure 2:
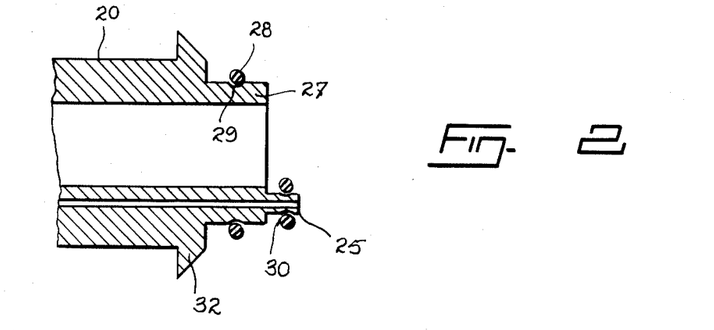
FIG. 2 is a longitudinal, cross sectional view of the second, free ends of the third and fourth tubes of the additive liquid introducing device of FIG. 1.

An annular retainer 31 integral with the tube 10 and made of somewhat elastic plastic material connects the tube 20 with the tube 10 and the tube 24 with the tube 11 by retaining the end 27 in the end 26 and the tubular extension 25 in the end 15, through abutment on of an annular collar 32 of triangular cross section. Upon connection of the tubes 20 and 24 with the tubes 10 and 11, respectively, the tube 20 (with the tube 24) is pushed in the direction opposite to that of the arrow 34 to insert the end 27 in the end 26 and the tubular extension 25 in the end 15. The retainer 31 is then elastically deformed by movement of the collar 32 in the direction opposite to that of arrow 34. When the collar 32 is inserted in the retainer 31, connection between the tubes 20 and 10 and the tubes 24 and 11 is completed. In order to increase the retaining strength of the retainer 31, a slidable annular cover 33 is slid along the tube 10 in the direction shown by the arrow 34 until the annular peak 36 of the retainer 31 is positioned in the annular groove 35 in the inner surface of the cover 33. In order to disconnect the tube 20 from the tube 10 and the tube 24 from the tube 11, the cover 33 is slid along the tube 10 in the direction opposite to that shown by the arrow 34, and the tube 20 is pulled in the direction of the arrow 34. The retainer 31 is then elastically deformed to allow removal of the assembly comprising the tubes 20 and 24, and the bag 16.

It can be appreciated from the above description that the ends 15, 26 and 27, the tubular extension 25, the collar 32, the retainer 31 and the cover 33 constitute a quick-fit connector allowing single-operation connection and disconnection.

In operation, the carrier liquid upstream of the venturi 9 is transmitted in the compartment 17 of the bag 16 through the interconnected tubes 10 and 20 as shown by the arrows such as 37. In order to prevent breaking of the bag 16 caused by a too high pressure of the carrier liquid in the compartment 17, a pressure limiting valve 38 is mounted within the tube 10. When the pressure of the carrier liquid in the compartment 17 reaches a predetermined value, the valve 38 closes in order to limit the pressure of the carrier liquid in the compartment 17 to this predetermined value, which pressure value can be supported by the bag 16.

When the valve 38 is open, as the pressure of the carrier liquid upstream of the venturi 9 is somewhat higher than that downstream of this venturi, pressure is applied by the carrier liquid in the compartment 17 on the additive liquid in the compartment 18 through the inner membrane 19 (see arrows such as 38). Additive liquid from the compartment 18 is therefore caused to flow in the tubes 24 and 11 and is introduced in the carrier liquid downstream of the venturi 9 through the orifice 13. The arrows such as 39 show that additive liquid from the compartment 18 is directed towards the end of the tube 24 by the action of the pressure (arrows 38) applied thereon through the membrane 19.

When the valve 38 is closed to limit the pressure of the carrier liquid in the compartment 17, additive liquid from the compartment 18 is still introduced in the carrier liquid through the tubes 24 and 11 and the orifice 14. Indeed, flowing of the carrier liquid through the venturi 9 creates a depression in the constriction formed in the pipe section 1, which depression aspirates additive liquid from the compartment 18 to introduce it in the carrier liquid through the orifice 14.

When the carrier liquid in the main pipe 2 stops to flow, the pressure of the carrier liquid upstream, downstream and inside of the venturi 9 are the same and no additive liquid from the compartment 18 is introduced in the carrier liquid through the orifices 13 and/or 14.

Preferably, the valve 38 is designed to close automatically when the assembly including the tubes 20 and 24 and the bag 16 is removed from the tubes 10 and 11 to prevent flowing of the carrier liquid out of the end 26 of the tube 10.

When the assembly including the tubes 20 and 24 and the bag 16 is removed, and the valve 38 is closed, carrier liquid from the pipe section 1 flows through the orifices 13 and 14, and the tube 11. Such flowing can be used to wash the tube 11. A closure of the tube 11 is also provided to prevent flowing of the carrier liquid at the end 15 thereof. Such closing is illustrated, by way of example, in FIG. 3 of the attached drawings, and is described in detail in the following description.

Figure 3:
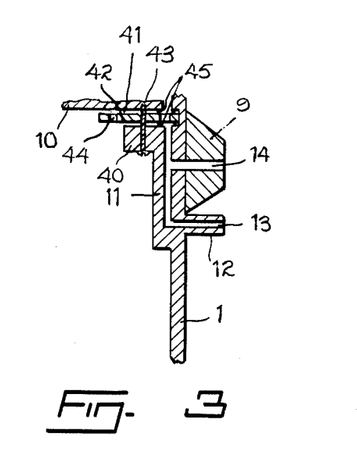
FIG. 3 represents a system used in combination with the second tube of the additive liquid introducing device of FIG. 1 for adjusting the quantity of additive liquid introduced in the carrier liquid.

The quantity of introduced additive liquid by volume unit of carrier liquid can be adjusted by appropriately selecting the diameter of the tube 11 and/or of the tube 24. However, if the introduced quantity of additive liquid must be varied, a system for achieving such variation is mounted on the additive liquid introducing device. Such a system is illustrated in FIG. 3, and comprises a further external protuberance 40 at the intersection between the pipe section 1 and the tube 10 in the region of the tube 11. The protuberance 40 defines a cavity 41 in which is rotatably mounted a disk 42 through an axle 43. The periphery of the disk 42 is provided with a plurality of holes of different diameters such as 44. By rotating the disk 42, the hole 44 of suitable diameter can be aligned with the tube 11 so as to easily and precisely adjust the quantity of additive liquid introduced by volume unit of carrier liquid. Two 0-rings 45 assure imperviousness of the joints between the hole 44 and the tube 11. When the disk 42 is so positioned that a portion thereof with no hole 44 is aligned with the tube 11, the latter is closed and no carrier liquid can flow through the free end 15 of the tube 11 when the assembly including the tubes 20 and 24 and the bag 16 is removed.

It can be easily appreciated from FIG. 1 of the attached drawings that the most costly pieces of the additive liquid introducing device are mounted on the pipe section 1 or tube 10. It is important because these pieces are reused and form a permanent assembly, while the assembly including the tubes 20 and 24 and the bag 16 is disposable. The device according to the invention is therefore designed to allow low cost manufacturing of the latter assembly. When the disposable assembly including the bag 16 is purchased with the compartment 18 filled with additive liquid, no refilling of the compartment 18 is necessary, no mixing of the additive liquid is required and therefore no contamination of for example a medicament constituting the additive liquid is possible. As the bag 16 is sold with its compartment 18 filled with additive liquid, a suitable closure member (not shown) may be associated with the tubular extension 25 to prevent loss of additive liquid through the tube 24, and contamination of the additive liquid, for example when the latter is a medicament.

Figure 4:
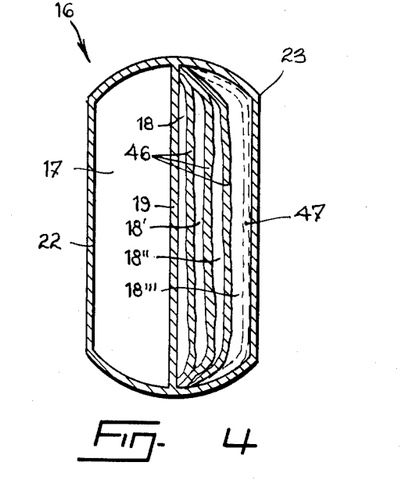
FIG. 4 is a transverse, cross sectional view of the bag of the additive liquid introducing device in accordance with the invention taken along the axis A-A of FIG. 1.

As shown in FIG. 4 of the attached drawings, representing a cross sectional view of the bag 16 taken along the axis A-A of FIG. 1, the bag 16 may comprise the compartment 17 defined by the layers of plastic material 22 and 19 and in communication with the corresponding end of the tube 20, as well as a plurality of second compartments 18, 18', 18" and 18'". Four compartments 18 are shown in FIG. 4, but the number of these compartments can be varied as required. The compartments 18 are defined by the membrane 19, by the layer of plastic material 23 and by the partition layers 46 also made of thin, transparent and flexible plastic material. The compartments 18, each tightly closed upon purchase can be opened by removing closure means (not shown) to communicate with the corresponding end of the tube 24, so that different additive liquids contained in the compartments 18 upon purchase can be introduced at the same time in the carrier liquid. The concentration of each additive liquid is adjusted as required so that appropriate amounts of the different additive liquids are injected in each volume unit of the carrier liquid. The embodiment of the bag 16 shown in FIG. 4 of the attached drawings is useful when a plurality of additive liquids which cannot be mixed beforehand have to be simultaneously introduced in the carrier liquid.

It should be pointed out here that the dimensions of the membrane 19 and layers 46 have to be substantially the same as that of the layer 23 so that each of the membrane 19 and layers 46 can lay on the entire inner surface of the layer 23, as shown by way of example by the dashed-lined layer 47 in FIG. 4, in order to allow complete emptying of all the compartments 18.

Figure 5:
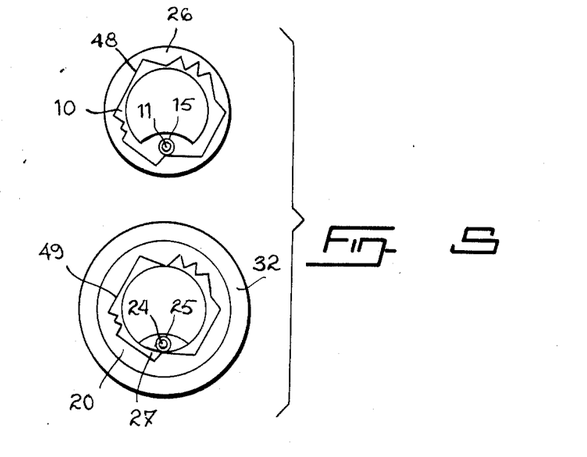
FIG. 5 represents a key system which can be used in the quick-fit connector of the additive liquid introducing device according to the invention.

FIG. 5 illustrates a key system used in the connection of the disposable assembly to the permanent assembly of the additive liquid introducing device. As can be seen, the internal surface of the free end 26 with increased internal diameter of the tube 10 is formed with a predetermined pattern 48. Accordingly, the free end 27 with reduced external diameter of the tube 20 has an outer surface which defines the same pattern identified by the reference 49. Consequently, upon connection of the permanent and disposable assemblies of the additive liquid introducing device, the pattern 49 is inserted in the pattern 48. When inserting the pattern 49 into the pattern 48, the tubular extension 25 is automatically and simultaneously inserted into the end 15 with increased internal diameter of the tube 11. Such a key system may, for example, prevent disposable assembly from another competitor manufacturer to be inserted in the permanent assembly of a certain manufacturer.

A pressure regulator 50 is mounted in the pipe section 1 upstream of the tube 10 and has as function to prevent excessive variation of pressure of the carrier liquid downstream thereof, so as to obtain a more precise quantity of introduced additive liquid by volume unit of carrier liquid.

Figure 6:
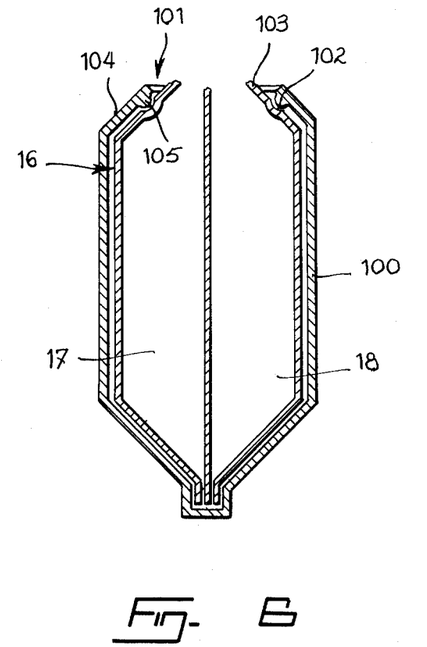
FIG. 6 illustrates a sheath which can be used to reinforce the bag of the additive liquid introducing device of the invention.

In some circumstances, it can be desired to increase the strength of the bag 16, so that the latter can resist to the pressure in the compartments 17 and 18. A removable sheath 100 can be used for that purpose. Such a sheath 100 adapts to the external shape of the bag 16. The sheath 100 comprises an upper opening 101 having dimensions suitable (a) to insert therein the bag 16 with the compartment 17 empty, but with the compartment 18 filled with additive liquid, and (b) to remove therefrom the bag 16 with its second compartment 18 empty.

As can be appreciated, the sheath 100 can be used to reduce the thickness of the walls of the bag 16 in order to reduce the cost of manufacturing the above defined disposable assembly including the bag 16.

An annular groove 102 is made in the upper, external wall 103 of the bag 16, in which groove 102 is inserted an annular, internal protuberance 105 provided on the inside of the upper wall 104 of the sheath 100. In order to give the required strength to the assembly, the upper wall 103 must be thicker than the rest of the bag. It can be appreciated that, when the protuberance 105 is inserted in the groove 102, the force produced by the pressure in the compartments 17 and 18 is applied to the sheath 100 and to the upper wall 103 of the bag 16 retained by the sheath through the set of annular groove 102 and protuberance 105.

Of course, the end of the tube 20 of FIG. 1, which is attached to the bag 16 should be modified to adapt to the bag and sheath assembly of FIG. 6. As an example, the upper wall 103 of the bag 16 may comprise the flange 21 of the tube 20 appropriately shaped and made of flexible plastic material. The other required modifications are believed to be within the knowledge of one skilled in the art and for that reason, they will not be further elaborated. It must however be kept in mind that the principle of operation and the other characteristics of the additive liquid introducing device of the invention must remain the same.

Some uses of the additive liquid introducing device of the invention are the following:

introduction of a chlorine solution in the water when the water filtration system of a residential house is out of order, thereby preventing illness risks due to contamination of the water;

automatic introduction of liquid soap and/or liquid fabric softener in required amounts (without loss) in the water used to wash clothes;

introduction of medicaments in the water to be drunk by living stock;

introduction of a sweetened solution in the coffee served by automatic vending machines;

automatic introduction of a liquid disinfectant in the water supplied to toilets;

injection of a liquid water softener in the water supplied to a dishwasher; and introduction of precise, small quantities of various solutions in liquids used in industrial processes.

etc . . .

Although the present invention has been described hereinabove by way of a preferred embodiment thereof, it should be pointed out that any modification to such a preferred embodiment within the scope of the appended claims, is not deemed to change or alter the nature of the present invention.

What is claimed is:

1. A device for introducing an additive liquid into a carrier liquid which is caused to flow in a main pipe, comprising:
   a pipe section so connected with the main pipe that the carrier liquid flows in said pipe section;
   a constriction formed in said pipe section and traversed by the carrier liquid, said carrier liquid being under a first pressure upstream of the constriction and under a second pressure lower than said first pressure downstream of the constriction;
   first tube means comprising (a) a first tube having a first end connected with said pipe section upstream of the constriction, and a second, free end, and (b) a second tube having a first end defining a first orifice communicating with the inside of said pipe section downstream of the constriction, and a second, free end adjacent to said second end of the first tube;
   a bag made of thin, flexible impermeable material, the bag defining an inner membrane which divides it into first and second compartments, said second compartment containing said additive liquid;
   second tube means comprising (a) a third tube having a first end attached to the bag and communicating with said first compartment, and a second, free end, and (b) a fourth tube having a first end also attached to the bag and communicating with said second compartment, and a second, free end adjacent to said second end of the third tube; and
   a quick-fit connector having first connecting means mounted on the second ends of the first and second tubes, and second connecting means mounted on the second ends of the third and fourth tubes, said first and second connecting means being designed for simultaneous connection of the second end of the third tube with the second end of the first tube, and of the second end of the fourth tube with the second end of the second tube as well as for simultaneous disconnection of the second end of the third tube from the second end of the first tube, and of the second end of the fourth tube from the second end of the second tube;
   whereby, in operation, carrier liquid under said first pressure upstream of the constriction is transmitted in said first compartment through the interconnected first and third tubes to apply pressure on the additive liquid in the second compartment through said inner membrane, to thereby cause flowing of additive liquid from said second compartment through the interconnected second and fourth tubes and introduction thereof in the carrier liquid under said second pressure downstream of the constriction through said first orifice.

2. An additive liquid introducing device according to claim 1, in which said bag, said second tube means and said second connecting means constitute a disposable unit made of plastic material.

3. An additive liquid introducing device according to claim 1, wherein said second tube means are substantially rigid.

4. An additive liquid introducing device according to claim 1, wherein said thin, flexible impermeable material is a transparent plastic material.

5. An additive liquid introducing device according to claim 1, wherein said constriction is formed by a venturi positioned in said pipe section.

6. An additive liquid introducing device according to claim 1, further comprising pressure limiting means disposed in said first tube for limiting to a predetermined value the pressure of the carrier liquid in said first compartment by closing the first tube when the pressure of the carrier liquid in said first compartment reaches said predetermined value in order to prevent breaking of the bag, said first end of the second tube defining a second orifice communicating with the inside of the constriction so that, when said pressure limiting means closes the first tube, the increase in speed of the carrier liquid within the constriction produces in said constriction a depression which causes by aspiration flowing of additive liquid from said second compartment through the second and fourth tubes and introduction thereof in said carrier liquid through the second orifice.

7. An additive liquid introducing device according to claim 6, wherein said pressure limiting means disposed in the first tube comprises means for preventing the carrier liquid to flow out of the second, free end of the first tube when the second, free end of the third tube is disconnected from the second, free end of the first tube.

8. The additive liquid introducing device of claim 1, further comprising pressure regulating means mounted in said pipe section upstream of the first tube for regulating the pressure of the carrier liquid downstream of said pressure regulating means.

9. The additive liquid introducing device of claim 1, further comprising means for varying the internal diameter of said second tube at a location thereof, in order to provide for adjustment of the quantity of additive liquid introduced in the carrier liquid.

10. The additive liquid introducing device of claim 1, in which the first and third tubes have a first internal diameter, and in which the second and fourth tubes have a second internal diameter substantially smaller than said first internal diameter.

11. The additive liquid introducing device of claim 10, in which at least a portion of the second tube is located inside the first tube, and in which at least a portion of the fourth tube is located inside the third tube.

12. The additive liquid introducing device of claim 10, wherein said first tube comprises a wall with a longitudinal, internal protuberance in which said second tube is formed, and wherein said third tube comprises a wall also with a longitudinal, internal protuberance in which said fourth tube is formed.

13. The additive liquid introducing device of claim 12, in which said first and second connecting means of the quick-fit connector comprise a reduction in external diameter at the second end of one of the first and third tubes, and an increase in internal diameter at the second end of the other of said first and third tubes, said reduced external diameter being substantially identical to the increased internal diameter so that the second end with reduced external diameter can be inserted in the second end with increased internal diameter.

14. The additive liquid introducing device of claim 12, in which said first and second connecting means of the quick-fit connector comprise a tubular extension at the second end of one of said second and fourth tubes, and an increase in internal diameter at the second end of the other of said second and fourth tubes, the tubular extension having an external diameter which is substantially the same as the increased diameter at the end of said other of the second and fourth tubes, so that said tubular extension can be inserted in said second end with increased internal diameter of said other of the second and fourth tubes.

15. The additive liquid introducing device of claim 13, in which said first and second connecting means of the quick-fit connector comprise a tubular extension at the second end of one of said second and fourth tubes, and an increase in internal diameter at the second end of the other of said second and fourth tubes, the tubular extension having an diameter which is substantially the same as the increased diameter at the end of said other of the second and fourth tubes, so that said tubular extension can be inserted in said second end with increased internal diameter of said other of the second and fourth tubes.

16. The additive liquid introducing device of claim 15, wherein said first and second connecting means of the quick-fit connector further comprise means for holding the second end with reduced external diameter of said one of the first and third tubes in the second end with increased internal diameter of said other of the first and third tubes, as well as said tubular extension of said one of the second and fourth tubes in the second end with increased internal diameter of said other of the second and fourth tubes.

17. The additive liquid introducing device of claim 15, further comprising first gasket means for sealing the joint formed by insertion of the second end with reduced external diameter of said one of the first and third tubes in the second end with increased internal diameter of said other of the first and third tubes, and second gasket means for sealing the joint formed by insertion of said tubular extension in the second end with increased internal diameter of said other of the second and fourth tubes.

18. The additive liquid introducing device of claim 1, in which said bag is made of thin, flexible plastic material, and in which said second tube means is substantially rigid and defines a flat, annular portion on which said bag is attached.

19. An additive liquid introducing device according to claim 1, wherein said bag defines at least three compartments, one of said at least three compartments constituting said first compartment, and the others of said at least three compartments all communicating with the first end of said fourth tube and each containing a different additive liquid to be introduced in the carrier liquid.

20. An additive liquid introducing device according to claim 1, wherein said pipe section comprises two ends provided with means for removably connecting said pipe section with said main pipe, for easy mounting of said pipe section on the main pipe as well as for easy removal of the pipe section and therefore of the additive liquid introducing device from the main pipe.

21. The additive liquid introducing device of claim 1, wherein said first and second connecting means of the quick-fit connector comprise a key system.

22. The additive liquid introducing device of claim 1, further comprising a removable sheath for covering said bag in order to increase the resistance of the bag to said first and second pressures, said sheath comprising an opening for inserting therein said bag with its first compartment empty, and with its second compartment filled with the additive liquid.

23. The additive liquid introducing device of claim 22, wherein said bag comprises a thicker wall adapted to be positioned over the opening of the sheath, said additive liquid introducing device further comprising a set of annular groove and protuberance formed on said thicker wall and sheath for retaining said thicker wall to the sheath, one of said annular groove and protuberance being formed on the sheath around the opening of said sheath.

* * * * *